United States Patent
Spears et al.

(10) Patent No.: US 6,283,148 B1
(45) Date of Patent: Sep. 4, 2001

(54) STANDING VALVE WITH A CURVED FIN

(75) Inventors: Harry L. Spears, Spring; Allen A. Pennington, Cyprais, both of TX (US)

(73) Assignee: Flowmore Systems, Inc., Tomball, TX (US)

( * ) Notice: Subject to any disclaimer, the term of this patent is extended or adjusted under 35 U.S.C. 154(b) by 0 days.

(21) Appl. No.: 09/514,567

(22) Filed: Feb. 23, 2000

Related U.S. Application Data (63) Continuation-in-part of application No. 08/992,646, filed on Dec. 17, 1997, now abandoned.
(60) Provisional application No. 60/033,390, filed on Dec. 17, 1996.

(51) Int. Cl.[7] .............................. F16K 15/04; F04B 53/12
(52) U.S. Cl. ..................... 137/533.11; 138/39; 251/126; 417/554
(58) Field of Search ................... 137/533.11, 533.13, 137/533.15; 138/39; 251/118, 126, 127; 417/547, 554, 555.2, 569

(56) References Cited

U.S. PATENT DOCUMENTS

| | | | |
|---|---|---|---|
| 272,684 | * 2/1883 | Hall | 122/438 |
| 556,850 | * 3/1896 | Kifer | 417/554 |
| 835,619 | * 11/1906 | Isaacs et al. | 366/165.4 |
| 904,368 | * 11/1908 | Simmons | 48/180.1 |
| 1,555,068 | * 9/1925 | Nixon | 137/533.15 |
| 1,566,613 | * 12/1925 | McDonald | 137/512 |
| 1,630,256 | * 5/1927 | Cleage et al. | 417/569 |
| 1,705,208 | * 3/1929 | Reid | 137/533.13 |
| 1,714,434 | * 5/1929 | O'Bannon | 417/554 |
| 1,759,081 | * 5/1930 | Anderson | 251/126 |
| 1,990,371 | * 2/1935 | Chadwick | 137/493.5 |
| 2,003,679 | * 6/1935 | Crickmer et al. | 137/533.15 |
| 2,743,677 | * 5/1956 | Fleming | 417/569 |
| 5,593,292 | * 1/1997 | Ivey | 417/554 |
| 5,642,990 | * 7/1997 | Short | 417/554 |
| 5,829,952 | * 11/1998 | Shadden | 417/547 |

\* cited by examiner

*Primary Examiner*—John Rivell
*Assistant Examiner*—Ramesh Krishnamurthy
(74) *Attorney, Agent, or Firm*—Bracewell & Patterson L.L.P.

(57) ABSTRACT

A valve for use in a sucker rod actuated fluid pump including a traveling valve assembly and a standing valve assembly within which a vortex is believed to be created to draft the ball check valve from its seat during the stroke of the sucker rod and thereby increase the amount of petroleum fluids pumped to the surface during each stroke of the fluid pump.

8 Claims, 8 Drawing Sheets

STANDING VALVE WITH A CURVED FIN

RELATED APPLICATIONS

This application is a continuation-in-part of U.S. patent application Ser. No. 08/992,646, entitled "Valve For Use In A Fluid Pump", filed Dec. 17, 1997 now abandoned. That application claims the benefit of U.S. Provisional Application Ser. No. 60/033,390, filed Dec. 17, 1996, entitled "Valve For Use In A Fluid Pump."

BACKGROUND OF THE INVENTION

1. Field of the Invention

The invention relates to a valve for use in a fluid pump for elevating fluids, and in particular, to a valve for use in a fluid pump for raising petroleum fluids through production tubing in completed oil and gas wells.

2. Description of Related Art

A conventional oil well includes a cased well bore with one or more strings of tubing extending downwardly through the casing into the oil, or other petroleum fluid, contained in the sub-surface mineral formation to be produced. The casing is perforated at the level of the production zone to permit fluid flow from the formation into the casing, and the lower end of the tubing string is generally open to provide entry for the fluid into the tubing.

One type of pump conventionally employed in structures of the type described is wedged into an internal constriction, or seating nipple, formed internally of the tubing below the fluid level. A metallic enlargement on the external body of the pump prevents it from traveling below the seating nipple and resilient seal rings on the body of the pump housing, or pump barrel, act to form a leak proof seal between the seating nipple and the pump housing, or barrel. The pump is generally driven by a mechanical linkage of metal or fiberglass rods, generally referred to as sucker rods, or valve rods, which extend from the pump to the well surface. The valve rod, or sucker rod, linkage is powered in a reciprocating motion by a conventional mechanical apparatus usually called a pumping unit located at the well surface.

The conventional pump itself generally includes a housing through which a piston or plunger is reciprocated by the sucker rod, or valve rod, linkage. In its simplest form, the conventional pump of the type described often includes a number of conventional ball and seat valves with at least one such valve in, or above, the piston, often referred to as the traveling valve assembly, and at least one other valve at the inlet port of the housing or barrel, often referred to as the standing valve assembly. On the upstroke of the plunger, the ball in the standing valve assembly is drawn away from its seat and the ball of the traveling valve assembly is forced over its seat to draw fluid from below the seating nipple and into the housing. On the piston's downstroke, the ball in the standing valve assembly is forced onto its seat and the ball in the traveling valve assembly moves away from its seat to allow the piston to move downwardly through the fluid contained in the housing. On the subsequent upstroke, the closing of the traveling valve assembly forces the fluid above the piston out of the housing through the outlet ports and into the tubing above the seating nipple and simultaneously fills the housing below the piston with fluid. Repetition of this cycle eventually fills the tubing string and causes the fluid to flow to the surface.

The previously described pump, or some variation thereof, is probably the most widely employed in applications where it is desired to drive a sub-surface pump by a surface powered, mechanical linkage. A significant problem in pumps of this type is generally known as a "pumped-off well" as will be hereinafter described with reference to one standing valve and one traveling valve; however, it should be understood that similar effects occur when more than one valve is used. Either initially, or eventually, the fluid in the reservoir is at a low pressure. On the upstroke of the plunger, the ball in the standing valve is initially drawn away from its seat, and the ball of the traveling valve is forced over its seat to draw fluid from below the seating nipple and into the housing. However, before a substantial portion of the upstroke is completed, the pressure of the fluid in the reservoir acting upon the ball in the standing valve is substantially reduced to the extent that the ball in the standing valve fails to be drawn away from its seat. Therefore, the ball in the standing valve blocks the passageway into the housing and prevents fluid from being drawn into the housing during the remaining portion of the upstroke. Similar problems occur on the downstroke with the ball in the traveling valve. Therefore, this "pumped-off well" condition results in substantially less fluid being brought to the surface during every stroke of the pump. This condition generally continues and tends to become more of a problem as the pressure of the fluid reservoir decreases.

Additionally, a significant problem is found in all other wells that incorporate the mechanical pumping device described above. Generally, in these other wells the seat and ball of the valves described above create a restriction and increase the frictional drag on the flow of reservoir fluids into the pump.

Accordingly, prior to the development of the present invention, there has not been a valve for use in a fluid pump for raising petroleum fluids through production tubing in a completed oil well which: increases the amount of fluid entering the housing, or barrel, for each stroke of the pump; increases the amount of time a ball is drawn and held away from its seat, thereby reducing the undesirable effects of a "pumped-off well" and reducing the frictional drag on the flow of reservoir fluids into the pump in all other wells; and is economical to use without frequent replacement of components. Therefore, the art has sought a valve for use in a sucker rod actuated fluid pump for raising petroleum fluids through production tubing in completed oil wells which: increases the amount of fluid entering the housing; increases the amount of time a ball is drawn and held away from its seat, thereby reducing the undesirable effects of a "pumped-off well" and reducing the frictional drag on the flow of reservoir fluids into the pump in other types of wells; and is more economical to use.

SUMMARY OF THE INVENTION

In accordance with the present invention, the foregoing advantages have been achieved through the present valve for use with a variety of sizes of fluid pumps, including 1¼", 1½", 1¾", and 2" fluid pumps. The valve of the present invention includes: an elongate valve body having a longitudinal axis, an upper and a lower end, and outer wall surface, and an internal bore having an interior surface extending between the upper and lower ends; a check valve, including a ball and seat, disposed adjacent the lower end of the valve body with the ball disposed for movement within a portion of the bore of the valve body; a means for connecting the upper end of the valve body to a portion of the fluid pump, the connecting means being disposed on the valve body; at least one fin having a length measured along a portion of the longitudinal axis of the valve body being disposed within a portion of the bore, the at least one fin having a width, an upper and a lower end, with the lower end of the at least one fin radially disposed, about the longitudinal axis of the valve body, a predetermined angle from the upper end of the at least one fin; a projection extending into the bore of the valve body a sufficient distance to prevent the passage of the ball through the upper end of the valve body; the bore having a diameter, with the diameter of the bore increasing from the lower end of the at least one fin to the upper end of the at least one fin, and the width of the fin increasing along its length from the lower end to the upper end of the at least one fin; and the predetermined angle is within a range of from 55° to 75° for use with 1¼" and 1½" fluid pumps; or the predetermined angle is within a range of from 25° to 45° for use with 1¾" and 2" fluid pumps.

A feature of the present invention is that the valve may include four fins. Another feature of the present invention is that the length of the at least one fin is approximately 2½" for 1¼" and 1½" fluid pumps, and the length of the at least one fin may be approximately 3" for 1¾" or 2" fluid pumps. An additional feature of the present invention is that the upper end of the at least one fin may have a smooth, rounded, semi-circular configuration. A feature of the present invention is that the connecting means may be a plurality of external threads formed on the outer wall surface of the upper end of the valve body, or the connecting means may be a plurality of internal threads formed on the interior surface of the bore at the upper end of the valve body.

In accordance with another aspect of the invention, some of the foregoing advantages may also be achieved by the present connector for joining two valves to form a traveling or standing valve assembly. The connector of the present invention includes: an elongate, cylindrical body having a longitudinal axis, upper and lower ends, and an internal bore having an internal surface and extending between the upper and lower ends of the cylindrical body; at least one fin, having an upper and a lower end, disposed on the internal surface of the bore and extending between the upper and lower ends of the cylindrical body, the at least one fin extending into the bore from the internal surface of the bore, with the upper end of the at least one fin being radially disposed, about the longitudinal axis of the cylindrical body, a predetermined angle from the lower end of the at least one fin; the upper end of the cylindrical body including means for connecting a valve to the cylindrical body; and the lower end of the cylindrical body including means for connecting a valve to the cylindrical body.

A further feature of the present invention is that the cylindrical body may have a length, and the predetermined angle may be within a range of 30° to 80° for every 2" to 3" of the length of the cylindrical body. Another feature of the present invention is that the predetermined angle may be approximately 60° and the length of the cylindrical body may be between 2" and 3". An additional feature of the present invention is that the length of the cylindrical body is 2.375".

The connector and valve of the present invention, when compared with the previously proposed prior art connectors and valves for fluid pumps, have the advantages of: increasing the amount of fluid entering the housing, or barrel, for each stroke of the pump; increasing the amount of time a ball is drawn and held away from its seat, thereby reducing the undesirable effects of a "pumped-off well" and reducing the frictional drag on the flow of reservoir fluids into the pump in other types of wells; and being more economical to use.

While the invention will be described in connection with the preferred embodiments, it will be understood that it is not intended to limit the invention to those embodiments. On the contrary, it is intended to cover all alternatives, modifications, and equivalents as may be included within the spirit and scope of the invention as defined by the appended claims.

DETAILED DESCRIPTION OF THE INVENTION

Figure 1:
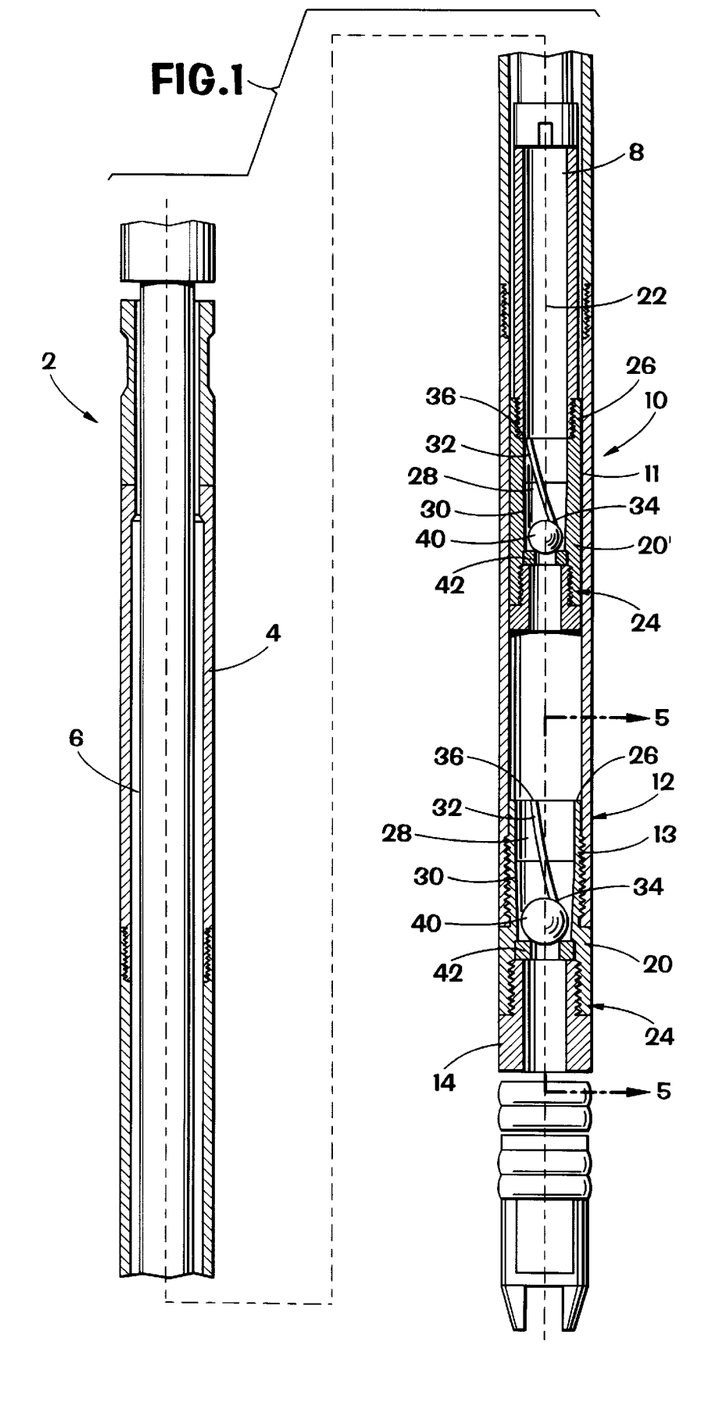
FIG. 1 is a partial cross-sectional view taken along the longitudinal axis of a conventional fluid pump for raising petroleum fluids through production tubing in completed oil wells, the pump including two valves in accordance with the present invention.

In FIG. 1 a conventional pump 2 for raising petroleum fluids with the present invention, is shown disposed within a conventional pump barrel, or housing, 4, having a valve rod 6, a plunger 8, a traveling valve assembly 10, a standing valve assembly 12, and a hold down, or seating nipple, 14. Disposed at the lower end of the pump barrel 4 is a standing valve assembly 12, and disposed intermediate the standing valve assembly 12 and the plunger 8 is the traveling valve assembly 10. The traveling valve assembly 10 and the standing valve assembly 12 are each shown as single valves; however, as is known in the art, and as will be hereinafter discussed in greater detail, the traveling valve assembly 10 and/or the standing valve assembly 12 can each have more than one valve. Pump barrel 4 forms a part of a conventional sucker rod, or valve rod, actuated fluid pump 2. As is well known in the art such conventional fluid pumps utilize a movable piston, or plunger, 8 disposed within the pump barrel 4 in a sliding, sealing relationship.

Figure 5:
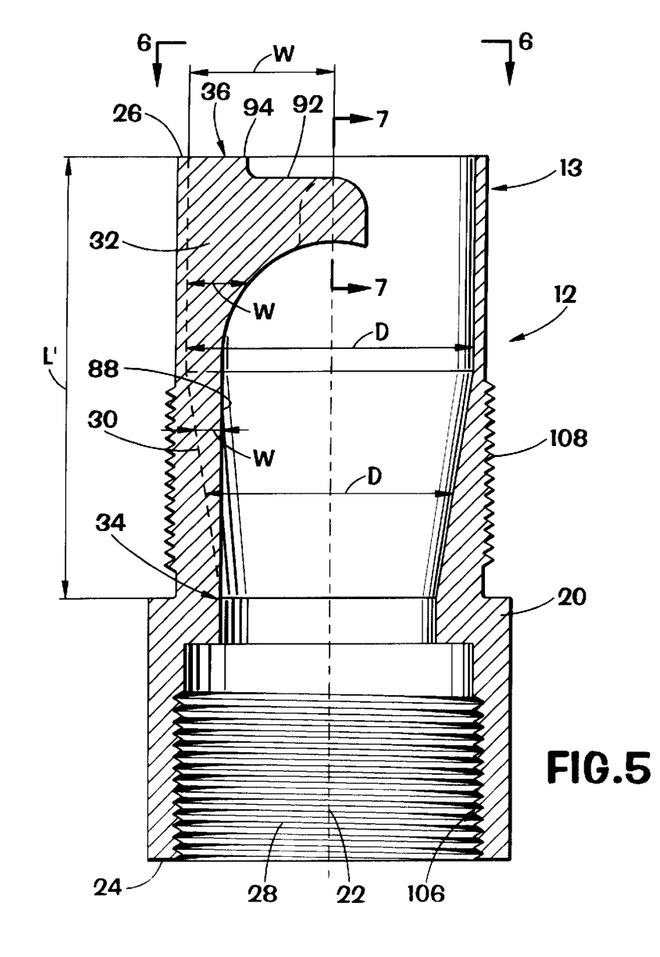
FIG. 5 is a cross-sectional view taken along line 5—5 of FIG. 1, the ball and seat not being shown for clarity.
Figure 6:
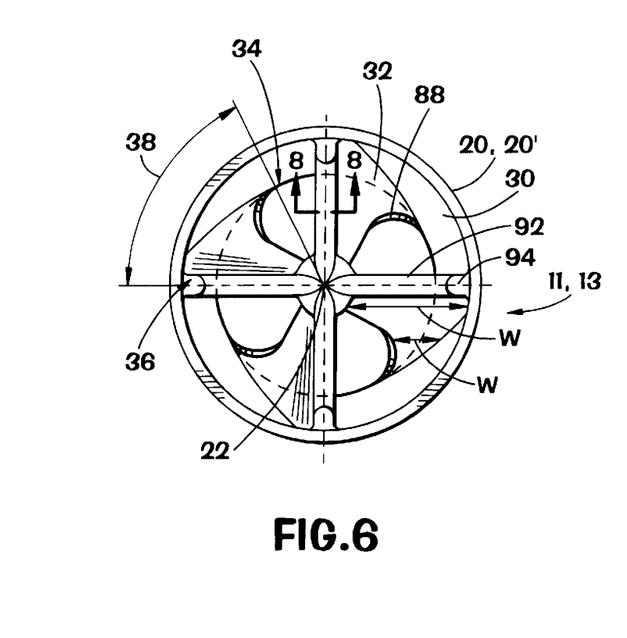
FIG. 6 is an end view taken along line 6—6 of FIG. 5.
Figures 7, 8, 9:
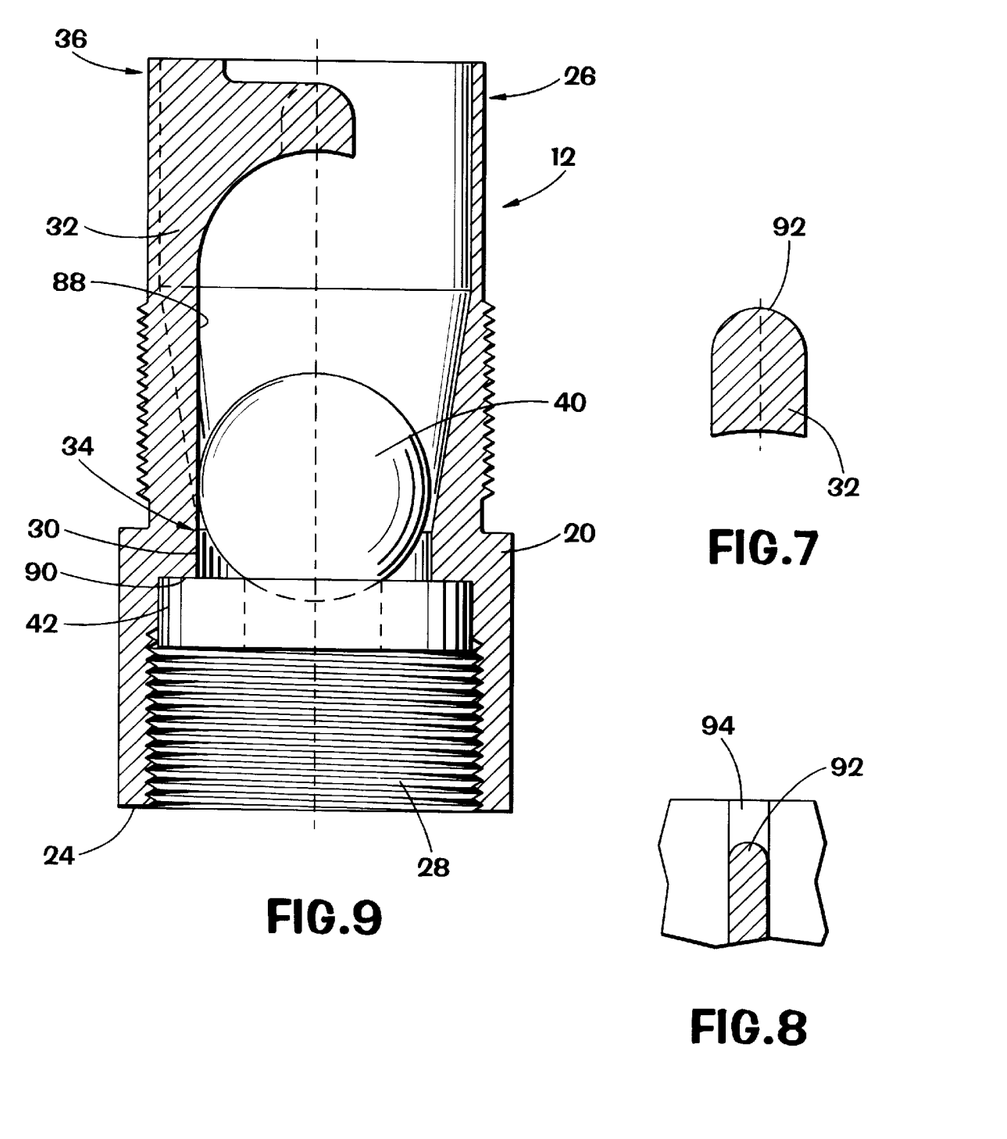
FIG. 7 is a partial cross-sectional view taken along line 7—7 of FIG. 5.
FIG. 8 is a cross-sectional view taken along line 8—8 of FIG. 6.
FIG. 9 is another cross-sectional view taken along line 5—5 of FIG. 1, illustrating the ball and seat.
Figure 10:
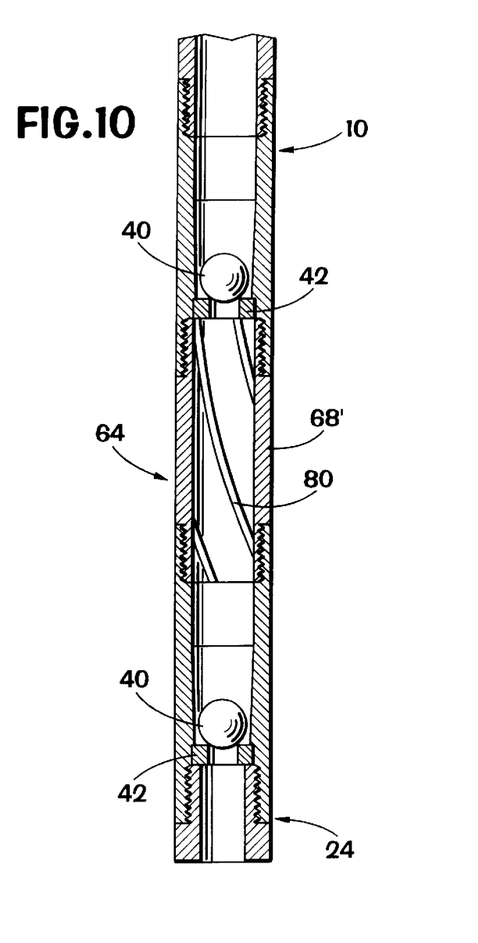
FIG. 10 is a partial cross-sectional view taken along the longitudinal axis of conventional ball and seat valves connected by a connector of the present invention for use as a traveling valve assembly.
Figure 11:
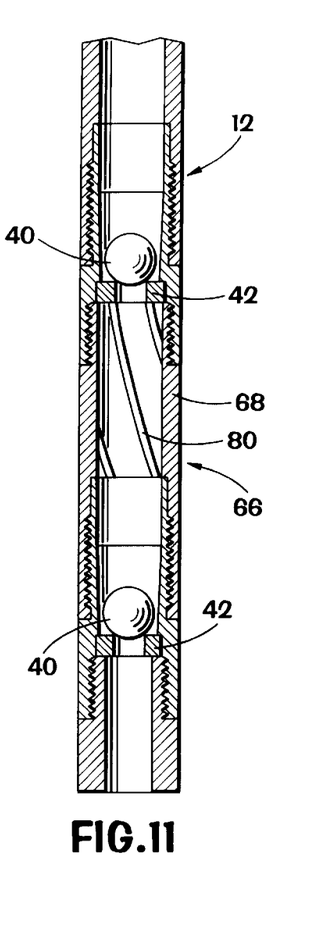
FIG. 11 is a partial cross-sectional view taken along the longitudinal axis of conventional ball and seat valves connected by the connector of the present invention for use as a standing valve assembly.
Figure 12:
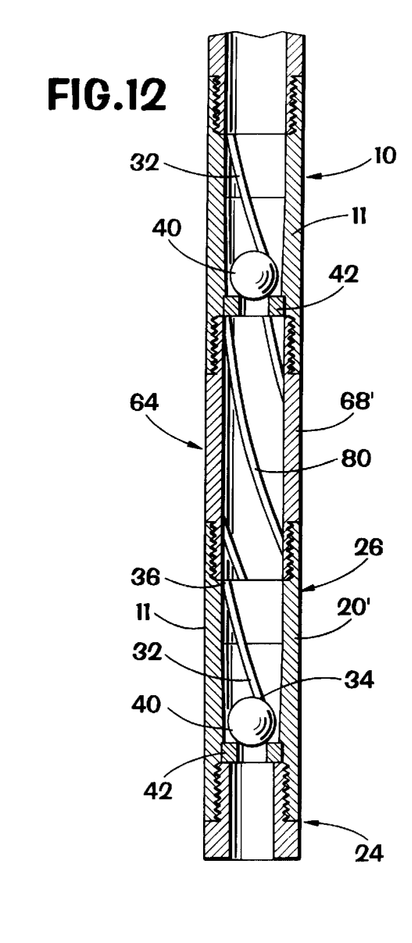
FIG. 12 is a cross-sectional view taken along the longitudinal axis of ball and seat valves connected by a connector of the present invention for use as a traveling valve assembly, wherein the ball and seat valves are valves of the present invention.
Figure 13:
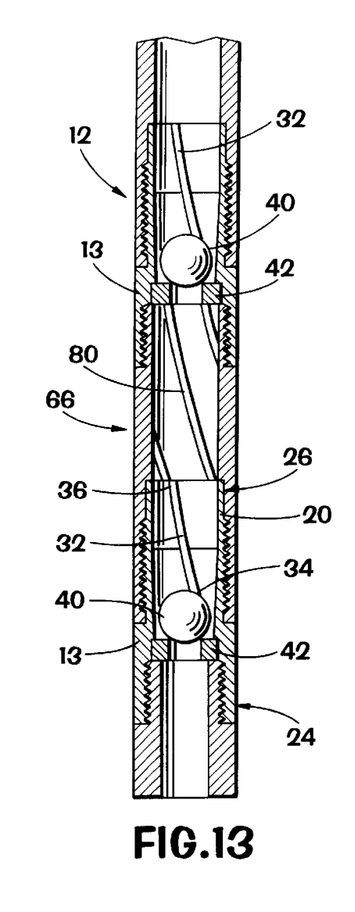
FIG. 13 is a cross-sectional view taken along the longitudinal axis of ball and seat valves connected with a connector of the present invention for use as a standing valve assembly, wherein the ball and seat valves are of the present invention.

Still with reference to FIGS. 1, 12 and 13 a traveling valve assembly 10 and a standing valve assembly 12, as also shown in FIGS. 5, 6, and 9, in accordance with the present invention, are shown to generally comprise at least one valve 11, 13 adapted for use in a fluid pump 2, two valves 11, 13 being illustrated in FIGS. 12 and 13. Throughout this description, primed reference numerals are used to denote elements having substantially the same structure and function as elements denoted with the same unprimed reference numerals. The valves 11, 13 are shown to generally comprise: a valve body 20, 20' having a longitudinal axis 22, a first, or lower, end 24, a second, or upper, end 26, a bore 28 having an inner surface 30 substantially centered about the longitudinal axis 22 and extending through the valve body 20, 20'; and at least one fin 32 having a first, or lower, end 34 and a second, or upper, end 36, the first end 34 disposed intermediate the first and second ends 24, 26 of the valve body 20, 20', and the second end 36 disposed adjacent the second end 26 of the valve body 20, 20'. The at least one fin 32 extends along the inner surface 30 of the valve body 20, 20' with the first end 34 of the at least one fin 32 being radially disposed a predetermined angle 38 (FIG. 6), from the second end 36 of the at least one fin 32 with respect to the longitudinal axis 22 of the valve body 20, 20'. As will be hereinafter described, the at least one fin 32 increases flow of a liquid material, gas, or mixtures thereof, such as hydrocarbons (not shown), through the valve body 20, 20'. A conventional ball check valve including ball 40 and seat 42 are preferably disposed within the bore 28. Preferably four fins 32 are used in the valves 11, 13 of the present invention, but a greater or lesser number may be used. Furthermore, it is understood that the valves of the present invention could be used with fluids other than those containing hydrocarbons (e.g., water).

The increase in the flow of a liquid or gas through the bore 28 is believed to result from the liquid material being rotated about the longitudinal axis 22, as the liquid material passes through the bore 28 and along the fins 32. This rotation is believed to form a vortex in the fluid. Because the vortex is formed above where the ball 40 is disposed, the vortex is believed to operate to draw the ball 40 away from the seat 42, thereby decreasing the frictional drag and lessening the effect of the restriction to the flow of fluids. This is believed to increase the amount of time the ball 40 is drawn away from the seat 42 during the stroke of the pump 2 and increases the amount of fluid that flows into the housing 4 and ultimately to the surface.

It is well known in the art that more than one valve may be used in a conventional traveling valve assembly and/or standing valve assembly by using a conventional connector to connect two conventional standing, or traveling, valves. However, the present invention may be implemented in a novel connector used with conventional standing valves, conventional traveling valves or valves 11, 13 of the present invention to form a traveling valve assembly 10 or a standing valve assembly 12.

Referring to FIGS. 2–4 and 10–15, novel connectors 64, 66 in accordance with the present invention are shown to generally comprise: a connector body 68, 68'; and at least one fin 80. The connector body has: a longitudinal axis 70, a first, or lower, end 72, a second, or upper, end 74; and a bore 76. The bore has an inner surface 78, substantially centered about the longitudinal axis 70 and extending through the connector body 68, 68'. The at least one fin 80 has a first, or lower, end 82 and a second, or upper, end 84. The first end 82 is disposed adjacent the first end 72 of the connector body 68, 68', and the second end 84 is disposed adjacent the second end 74 of the connector body 68, 68'. The at least one fin 80 extends along the inner surface 78 of the connector body 68, 68', with the at least one fin 80 being radially and angularly disposed with respect to the longitudinal axis 70, and along the length of the connector body 68, 68', whereby the at least one fin 80 increases flow of a liquid material (not shown) through the connector body 68, 68'.

Preferably four fins are used in the connector of the present invention, but a greater or lesser number may be used. Furthermore, it is understood that the connector of the present invention could be used with fluids other than those containing hydrocarbons (e.g., water).

Figure 2:
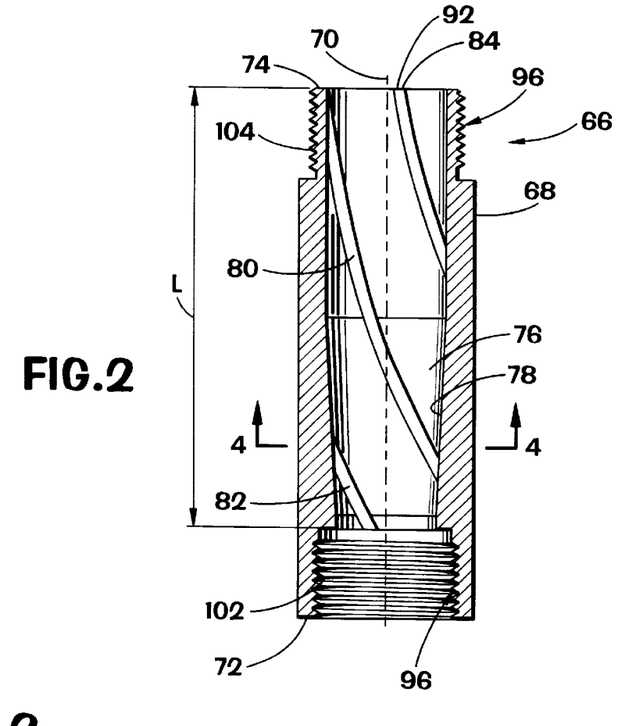
FIG. 2 is a partial cross-sectional view taken along the longitudinal axis of a connector of the present invention for use with a standing valve assembly as shown in FIG. 11.
Figure 3:
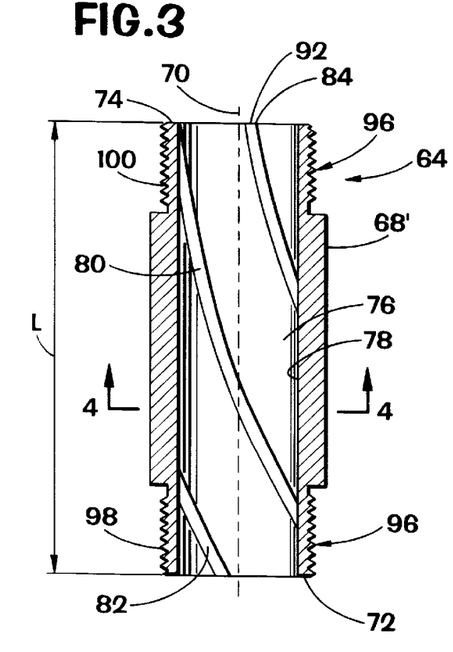
FIG. 3 is a partial cross-sectional view taken along the longitudinal axis of a connector of the present invention for use with a traveling valve assembly as shown in FIG. 10.
Figure 4:
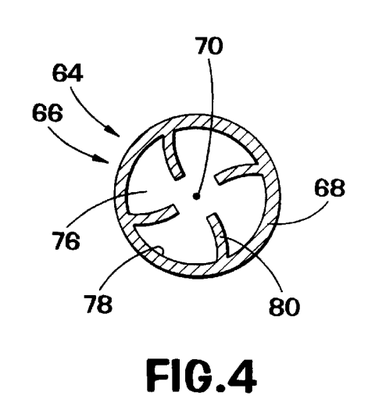
FIG. 4 is a cross-sectional view taken along line 4—4 of FIGS. 2 or 3.

The increase in the flow of a liquid material through the connector body 68, 68' is believed to result from the liquid material being rotated about the longitudinal axis 70, as the liquid material passes through the bore 76 and along the fins 80. This rotation is believed to organize the liquid material into a swirling flow pattern. Further, this rotation is believed to form a vortex in the liquid. Because the connector is above the ball check valve in a conventional valve or a valve of the present invention, the vortex is believed to operate to draw the ball check valve away from its seat. These aspects of the present invention are believed to increase the amount of the stroke the ball is drawn away from its seat, decrease the frictional drag on the flow of fluids, and increase the amount of fluid that flows into the housing and ultimately to the surface.

With reference to FIGS. 2–3, it is seen that connector body 68, 68' has fins 80. The fins 80 have a length L. Similarly, with reference to FIG. 5, it is seen that the valve body 20, 20' has fins 32. The fins 32 also have a length L'. The length L, L' in the connectors 64, 66 and the valves 11, 13 of the present invention are preferably within the range of from 1 to 10 inches.

Referring to FIGS. 2–4, it is seen that connector body 68, 68' has fins 80. The fins 80 have a first end 82 radially disposed a predetermined angle (like the angle 38 in FIG. 6) from the second end 84 with respect to the longitudinal axis 70. In at least one embodiment the predetermined angle is within the range of 30 to 90 degrees and preferably, is 60 degrees. Similarly, referring to FIG. 6, the valve body 20, 20' has fins 32 having the first end 34 radially disposed a predetermined angle 38 from the second end 36 with respect to the longitudinal axis 22. In at least one embodiment of the present invention the predetermined angle for the connectors 64, 66 is within the range of 30 to 90 degrees for every 2" to 3" of length L and preferably, the predetermined angle is 60 degrees when the length L is between 2" to 3". A preferred length L is 2.375". However, it should be readily apparent to one skilled in the art that the length L of the fins 80 will affect the number of degrees of the predetermined angle. The values set forth above for the length L of the fins 80 and the number of degrees of the predetermined angle are given in light of the general desire to minimize the length of the connector body 68, 68'.

Still with reference to FIGS. 4 and 6, it may be seen that the fins 32, 80 may be disposed substantially perpendicular to the inner surface 30, 78 in at least one embodiment of the present invention.

Referring to FIGS. 5 and 6, it may be seen that in at least one embodiment the fins 32 have a width W and the width W decreases from proximate the second end 36 substantially to the inner surface 30 at the first end 34 of the fins 32. This allows, in the case of a traveling valve assembly 10 or a standing valve assembly 12, for the ball 40 (FIG. 9) to move along the side edge 88 of the fins 32. This is shown more clearly in FIG. 9, wherein the ball 40 is shown as being in guiding contact with the fins 32 toward the seat 42. Similarly, it should be appreciated that in at least one embodiment of the connector of the present invention the connector could have the same construction or the width of the fins could be constant, or fixed. The upper end 36 of fin 32 preferably extends into bore 28 a sufficient distance to provide a projection, which prevents the passage of ball 40 through the upper end of the valve body.

Still with reference to FIG. 5, in at least one embodiment the diameter D of the bore 28 of the valve body 20, 20' increases from proximate the first end 34 of the fins 32 to a point intermediate the first end 34 of the fins 32 and the second end 26 of the valve body 20, 20'. This increases the cross-sectional flow area for the fluid flowing through the bore 28 by drafting the ball into a larger chamber, and this provides for increased fluid flow around ball 40 (FIG. 9), thereby decreasing the frictional drag and lessening the effect of the restriction to the flow of fluids. Similarly, it should be appreciated that in at least one embodiment of the connector 64, 66 of the present invention the diameter D of the bore 76 of the connector body 68, 68' increases from proximate the first end 82 of the fins 80 to a point intermediate the first end 82 of the fins 80 and the second end 74 of the connector body 68, 68'. This increases the cross-sectional flow area for the fluid flowing through the bore 76.

Preferably, a traveling valve 11 or standing valve 13 of the present invention would include both aspects of the foregoing embodiments wherein the diameter D of the bore 28 of the valve body 20, 20' increases from proximate the first end 34 of the fins 32 to a point intermediate the first end 34 of the fins 32 and the second end 26 of the valve body 20, 20', and the fins 32 have a width W, and the width W decreases from proximate the second end 36 of the fins 32 to substantially the inner surface 30 at the first end 34 of the fins 32. Similarly, it should be understood that it is preferable that a connector 64, 66 of the present invention also include both aspects of the foregoing embodiments wherein the diameter D of the bore 76 of the connector body 68, 68' increases from proximate the first end 82 of the fins 80 to a point intermediate the first end 82 of the fins 80 and the second end 74 of the connector body 68, 68' and the fins 80 have a width W, and the width W decreases from proximate the second end 84 of the fins 80 to substantially the inner surface 78 at the first end 82 of the fins 80.

Now referring to FIG. 9, it is advantageous for the valve body 20, 20' to have a lip, or internal shoulder 90, disposed along the inner surface 30 and between the first end 24 of the valve body 20, 20' and the first end 34 of the fins 32 and for the seat 42 to be in contact with the lip 90. Lip or, internal shoulder, 90 provides a stable mounting surface for the seat 42 in the valve body 20, 20'.

With reference to FIGS. 5–7, the fins 32 have an end surface 92 at the second end 36 of the fins 32 and the end surface 92 has a smooth rounded, semi-circular, configuration, substantially perpendicular to the longitudinal axis 22 and facing opposite the first end 34 of the fins 32. With reference to FIGS. 5–6 and 8, it is seen that the end surface 92 may have a rounded notch 94 formed adjacent the inner surface 30 to increase its flow characteristics. It is further believed that the rounded end surface and the rounded notch help to minimize turbulent flow characteristics and gas break-out from the fluid.

With reference to FIGS. 2–3, 14–15, and 5, it is seen that it is advantageous for the valve body 20, 20' or the connector body 68, 68' to further include a means for connecting 96 the valve body or connector body to other well components like connectors, hold downs, plungers or valves. The means for connecting 96 may be any of several means readily apparent to one skilled in the art, including a weld, clamp, clip, pin, bond, or preferably threads 98, 100, 102, 104, for the connector body and threads 106, 108 for the valve body.

Figure 14:
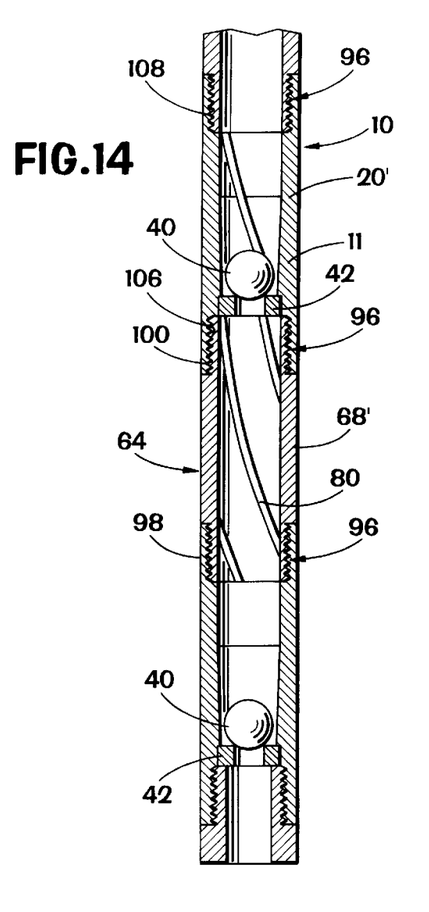
FIG. 14 is a cross-sectional view taken along the longitudinal axis of ball and seat valves connected by a connector of the present invention for use as a traveling valve assembly, wherein at least one of the ball and seat valves is a valve of the present invention.
Figure 15:
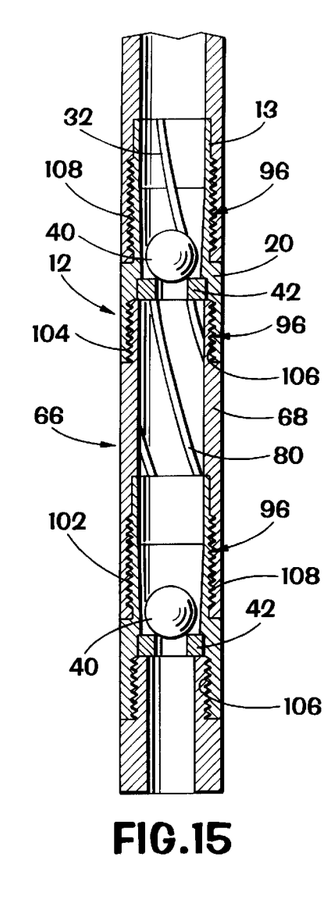
FIG. 15 is a cross-sectional view taken along the longitudinal axis of ball and seat valves connected by a connector of the present invention for use as a standing valve assembly, wherein at least one of the ball and seat valves is a valve of the present invention.

As is illustrated in FIGS. 10–15, it should be readily apparent to one skilled in the art that many different combinations of connectors 64, 66 or valves 11, 13 of the present invention may be used in combination with each other or in combination with conventional connectors or valves to achieve the objects of the present invention. As shown more clearly in FIGS. 10–11, the connector 64, 66 of the present invention may be used with at least one conventional valve 11 to form a traveling valve assembly 10 or a standing valve assembly 12, with two conventional traveling valves 11 or standing valves 13 being illustrated. Further, as shown in FIGS. 14–15, the connector 64, 66 of the present invention may be used in combination with at least one valve 11, 13 of the present invention and at least one conventional valve to form a traveling valve assembly 10 or a standing valve assembly 12. Finally, as shown in FIGS. 12–13, a connector 64, 66 of the present invention may be used in combination with one or more valves 11, 13 of the present invention to form a traveling valve assembly 10 or a standing valve assembly 12, with two standing valves 12 and traveling valves 10 of the present invention being illustrated.

Figure 16:
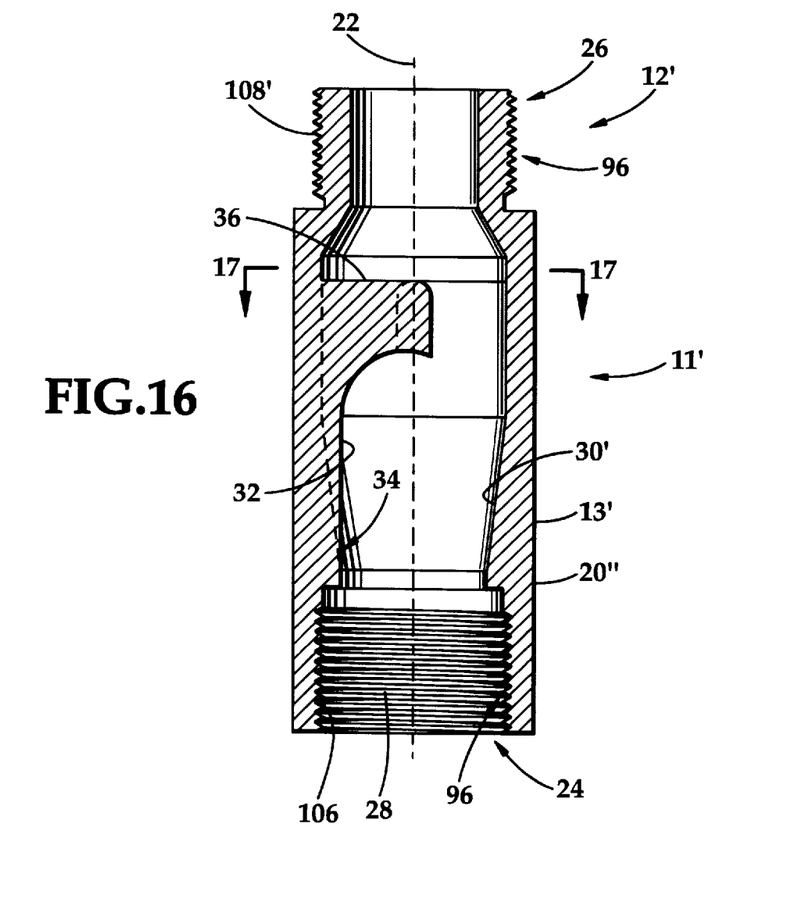
FIG. 16 is a partial cross-sectional view of another embodiment of a valve in accordance with the present invention.
Figure 17:
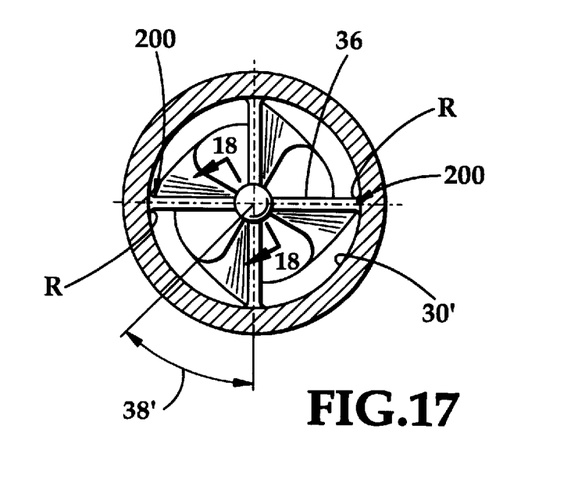
FIG. 17 is a partial cross-sectional view taken along line 17—17 of FIG. 16.
Figure 18:
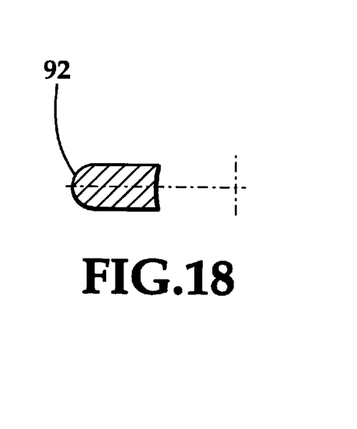
FIG. 18 is a cross-sectional view taken along line 18—18 of FIG. 17.

With reference to FIGS. 16–18, another embodiment of valves 11, 13, in accordance with the present invention will be described. Valve 13' for use in a standing valve assembly 12', is of similar construction to that of valve 13 illustrated in connection with FIGS. 5, 6, and 9, and includes a valve body 20", having a longitudinal axis 22, a first, or lower end 24, a second, or upper, end 26, a bore 28 having an inner surface 30' substantially centered about the longitudinal axis 22 and extending through the valve body 20"; and at least one fin 32 having a first, or lower end 34 and a second, or upper end, 36, with both the first and second ends 34, 36, disposed intermediate the first and second ends 24, 26 of the valve body 20". The at least one fin 32 extends along the inner surface 30' of the valve body 20" with the first end 34 of the at least one fin 32 being radially disposed a predetermined angle 38' (FIG. 17) from the second end 36 of the at least one fin 32 with respect to the longitudinal axis 22 of the valve body 20". The width W, and length L' of fin 32 of valve 13' is in accordance with the width W and length L' of fin 32 described in connection with valve 13, as previously described. Similarly, the diameter D of bore 28, from the lower end 24 to the upper end 36 of the at least one fin 32 is also in accordance with the diameter D of bore 28 as previously described in connection with valve 13. Securing means 96, or internal threads 106, of valve 13' are the same as those of valve 13 of FIG. 5. Valve 13' differs from that of valve 13 of FIG. 5, in that securing means 96 at the upper end 26 of valve body 20" is preferably comprised of a plurality of external threads 108', which are disposed at the upper end 26 of valve body 20", in contrast to threads 108 disposed intermediate the upper and lower ends 24, 26 of valve 13. The portion of valve body 20" disposed above the upper end 36 of fin 32 smoothly transitions down to permit external threads 108' to be formed at the upper end 26 of valve body 20". By providing securing means 96, or external threads 108' at the upper end 26 of valve body 20", valve 13' may be readily connected to other components to make up a conventional API connection, without the use of any intermediate connectors. Such a connection provides for a metal-to-metal seal which is advantageous and capable of resisting and withstanding high fluid pressures within valve body 20".

By providing valve body 20" with a set of internal threads at the location of threads 108', valve body 20" may be utilized as a valve 11' for use in a traveling valve assembly. Such a connection is indicated as reference numeral 108 in FIG. 14, in connection with valve body 20'.

As with valves 11, 13 previously described, preferably four fins 32 are provided for valves 11', 13', with the upper end 36 of fins 32 being provided with a rounded end construction 92, as illustrated in FIGS. 7 and 18. Similarly, a notch 94 (not shown) may be provided for fins 32 of valves 11' and 13'.

It has been discovered that with valves 11, 11', 13, and 13', substantial increases in fluid flow through a valve assembly 10, 12, 11', and 12' can be obtained if particular predetermined angles 38, 38' and lengths L' are maintained, dependent upon the particular size of the valves 11, 11', 13, and 13'. In this regard, for a valve 11', 13', known as a 1¾" valve, which means the outer diameter of threads 108' is 1¾" and valve 11', 13', is intended to be connected to a conventional 1¼" or 1½" pump, particularly good flow characteristics are obtained if predetermined angle 38' falls within a range of from 55° to 75°. Particularly good results are obtained if predetermined angle 38' is 65°, and the length L' of fins 32 is approximately 2½". It has been found that for valves referred to as a 2¼" valve, or a valve having exterior threads 108' with an outer diameter of 2¼", which are intended to be used with 1¾" or 2" conventional pumps, particularly good flow characteristics are obtained if the predetermined angle 38' is within a range of 25° to 45°. Particularly good flow results are obtained if the length L' of fins 32 is approximately 3", and the predetermined angle 38' is 35°. It is believed that the foregoing predetermined angles 38' and length L' are critical in order to obtain the most advantageous flow characteristics through valves 11' and 13'.

Figure 19:
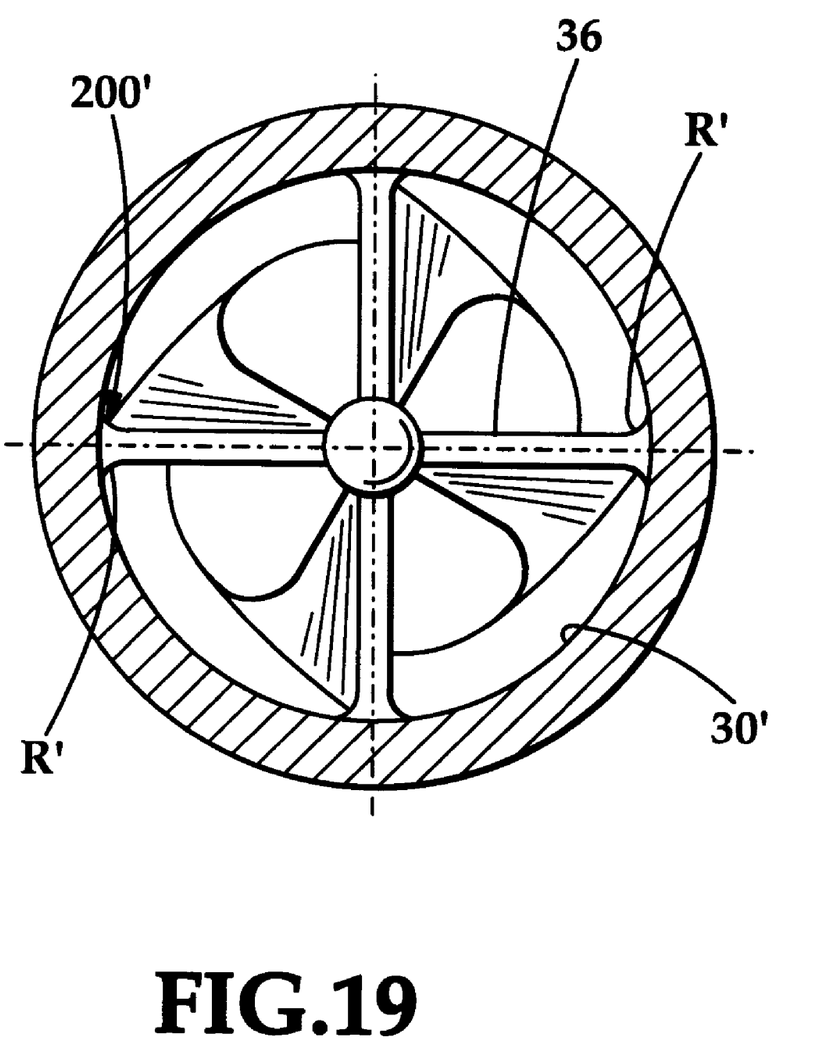
FIG. 19 is a cross-sectional view of another embodiment of a valve in accordance with the present invention taken along line 17—17 of FIG. 16.

It has been recently discovered that substantial increases in the life and durability of standing valves 13' of FIG. 16 may be obtained by modifying the connection 200 (FIG. 17) between the fins 32 and the inner surface 30' of bore 28. With reference to FIG. 17, the radius of curvature R of the connection 200 between the second, or upper, end 36 of fins 32 and the inner surface 30' of bore 28 was approximately 0.03 inch. With that radius of curvature R, standing valves 13' suffered from a disadvantage that in some instances of use, the fins 32 would separate from the inner surface 30' of bore 28, leading to the premature failure of the valve. As shown in FIG. 19, radius of curvature R' has been increased, leading to a substantial increase in the life and durability of standing valves 13' of FIG. 16. Preferably the radius of curvature R' of the connection 200' between the upper end 36 of fins 32 and the inner surface 30' of bore 28, falls within a range of approximately 0.09 inch to 0.15 inch, with a preferred radius of curvation R' being approximately 0.125 inches. The radius of curvature R' of the connection 200' between fins 32 and the inner surface 30' of bore 28 may vary along the length of the fins 32 between the upper and lower ends 34, 36 of fins 32, or may maintain a constant value. Preferably the radius of curvature R' is greater toward the upper end 36 of fins 32.

It should be understood that the invention is not limited to the exact details of construction, operation, exact materials, or embodiments shown and described, as obvious modifications and equivalents will be apparent to one skilled in the art. Accordingly, the invention is therefore to be limited only by the scope of the appended claims.

What is claimed is:

1. A standing valve for use with a variety of sizes of fluid pumps, including 1¼", 1½", 1¾", and 2" fluid pumps, comprising:

an elongate valve body having a longitudinal axis, an upper and a lower end, an outer wall surface, and an internal bore having an interior surface extending between the upper and lower ends;

a check valve, including a ball and seat, disposed adjacent the lower end of the valve body with the ball disposed for movement within a portion of the bore of the valve body;

a means for connecting the upper end of the valve body to a portion of the fluid pump, the connecting means being disposed at the upper end of the valve body;

at least one fin having a length measured along a portion of the longitudinal axis of the valve body and being disposed within a portion of the bore, the at least one fin having a width, an upper and a lower end, with the lower end of the at least one fin radially disposed, about the longitudinal axis of the valve body, a predetermined angle from the upper end of the at least one fin, and the upper and lower ends of the at least one fin are both disposed intermediate the lower and upper ends of the valve body;

a connection formed between the at least one fin and the interior surface of the internal bore of the elongate valve body, the connection having a radius of curvature within a range of approximately 0.09 inch to 0.15 inch;

a projection extending into the bore of the valve body a sufficient distance to prevent the passage of the ball through the upper end of the valve body;

the bore having a diameter, with the diameter of the bore increasing from the lower end of the at least one fin to the upper end of the at least one fin, and the width of the fin increasing along its length from the lower end to the upper end of the at least one fin; and the predetermined angle is within a range of from 55° to 75° for use with 1¼" and 1½" fluid pumps; or the predetermined angle is within a range of from 25° to 45° for use with 1¾" and 2" fluid pumps.

2. The valve of claim 1, including four fins.

3. The valve of claim 1, wherein the length of the at least one fin is approximately 2½" for 1¼" and 1½" fluid pumps.

4. The valve of claim 1, wherein the length of the at least one fin is approximately three inches for 1¾" or 2" fluid pumps.

5. The valve of claim 1, wherein the upper end of the at least one fin has a smooth, rounded semi-circular configuration.

6. The valve of claim 1, wherein the connecting means is a plurality of external threads formed on the outer wall surface at the upper end of the valve body.

7. The valve of claim 1, wherein the connecting means is a plurality of internal threads formed on the interior surface of the bore at the upper end of the valve body.

8. The valve of claim 1, wherein the radius of curvature of the connection is approximately 0.125 inch.

* * * * *